United States Patent [19]

Depeige

[11] Patent Number: 4,927,098
[45] Date of Patent: May 22, 1990

[54] MECHANISM FOR FASTENING A LIFE-SAVING DEVICE OF THE SIMPLE EVACUATION SLIDE OR DINGHY TYPE FOR AIRCRAFT

[75] Inventor: Alain Depeige, Tournefeuille, France

[73] Assignee: Aerospatiale Societe Nationale Industrielle, Paris, France

[21] Appl. No.: 259,758

[22] Filed: Oct. 18, 1988

[51] Int. Cl.$^5$ .............................................. B64D 9/00
[52] U.S. Cl. .................................. 244/137.2; 244/905
[58] Field of Search ............... 244/905, 137.2; 24/615, 24/490

[56] References Cited

U.S. PATENT DOCUMENTS

| 3,397,432 | 8/1968 | Banas | 24/201 |
| 3,435,492 | 4/1969 | Banas | 24/230 |
| 4,715,562 | 12/1987 | Bokalot | 244/905 |

FOREIGN PATENT DOCUMENTS 192503 8/1986 European Pat. Off. .
2029167 12/1971 Fed. Rep. of Germany .

*Primary Examiner*—Charles T. Jordan
*Assistant Examiner*—Rochelle Lieberman
*Attorney, Agent, or Firm*—Fisher, Christen & Sabol

[57] ABSTRACT

This invention relates to mechanisms for fastening a life-saving device, which comprises a rod, one of the two ends of the rod comprising means for cooperating with means for clipping and release with respect to a first shoe, a counter-rod mounted to slide with respect to the rod so that the counter-rod and rod may be located in two positions, "retracted" and "extended", a spring mounted between the rod and counter-rod to tend to position them in the "extended" position, means for controlling the slide of the rod with respect to the counter-rod in a given direction, the counter-rod comprising an endpiece whose shape is complementary of that of a recessed housing in a second shoe. This invention is more particularly applicable to the fastening of simple evacuation slides or dinghies in aircraft.

12 Claims, 3 Drawing Sheets

MECHANISM FOR FASTENING A LIFE-SAVING DEVICE OF THE SIMPLE EVACUATION SLIDE OR DINGHY TYPE FOR AIRCRAFT

FIELD OF THE INVENTION

The present invention relates to mechanisms for fastening a life-saving device of the simple evacuation slide or dinghy type.

BACKGROUND OF THE INVENTION

Aeronautic safety regulations require that aircraft having to fly over the sea must carry dinghy type evacuation slides, which, when the aircraft is obliged to land on the sea, enable the passengers to be evacuated fairly rapidly and, in addition, provide them with a practical floatable means. Such slides are generally mounted on the doors, in order to be used without loss of time when required. When a slide is to be used by the passengers, the crew open the door of the aircraft, simultaneously releasing the slide and actuating appropriate inflation thereof. However, it is obvious that, whilst the passengers are passing from the interior of the aircraft onto the slide, the latter must imperatively remain fastened to the threshold of the door and, when all the passengers have emerged, it must be very easily and rapidly disconnected from said threshold.

Several mechanisms performing these functions have been developed. They comprise, on the one hand, fastening means generally fast with the threshold of the door, for example shoes located on each side of this door and, on the other hand, connection means fast with the slide and adapted to cooperate with the fastening means in order to maintain the slide in place when the passengers climb thereon and, then, to release it from the aircraft very rapidly so that it can move away quickly Among these connection means, the most well-known comprise a principal bar adapted to cooperate with the fastening shoes by so-called setting and latching-unlatching mechanisms and by a second secondary bar connected to the principal bar by a rapid-release mechanism, this secondary bar being connected to the slide, for example, by lashing straps.

These mechanisms give complete satisfaction as to the result for which they are designed. However, it is well known that all manufacturers of means of transport, and more particularly in the domain of aeronautics, seek to reduce weight of the vehicles.

It is therefore an object of the present invention to produce a mechanism for fastening a life-saving device of the simple evacuation slide or dinghy type, whose performance is as high as those of the prior art, if not higher, but which is, in particular, much lighter in that it comprises fewer parts than those of the prior art, whilst being very easy to handle.

SUMMARY OF THE INVENTION

More precisely, the present invention relates to a mechanism for fastening a life-saving device of the simple evacuation slide or dinghy type for an aircraft, with at least one system of two fastening shoes fast with the floor of said aircraft, at least a first of said shoes comprising a recessed housing, characterized in that it comprises:

a rod, one of the two ends of said rod comprising means for clipping and releasing with respect to the other second shoe, a counter-rod, means for slidably mounting a first end of said counter-rod with respect to said rod, so that said counter-rod and said rod may lie in at least two positions, respectively, a first, so-called "retracted" position and a second, so-called "extended" position, means for applying an elastic force between said rod and counter-rod to tend to position them in said "extended" position, means for latching-unlatching said rod and counter-rod with respect to each other in at least one of the two positions, means for controlling slide of one of said rod and counter-rod with respect to the other in a given direction, the second end of said counter-rod comprising an endpiece whose shape is substantially complementary of said recessed housing in said first shoe, so that said endpiece may be housed in said recessed housing.

BRIEF DESCRIPTION OF THE DRAWINGS

The invention will be more readily understood on reading the following description with reference to the accompanying drawings, in which.

DETAILED DESCRIPTION OF THE DRAWINGS

Figures 1, 4:
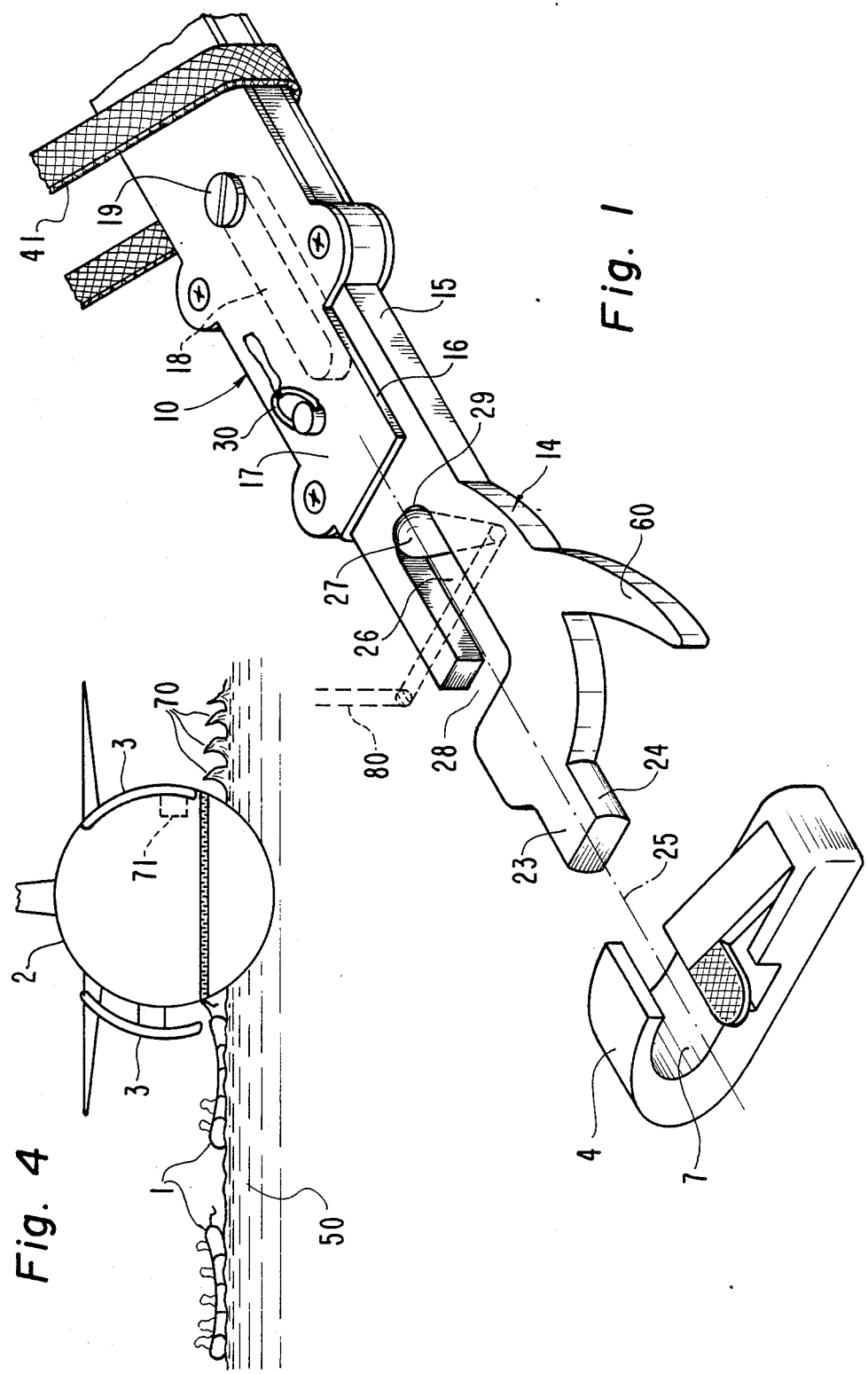
FIG. 1 is an exploded view in perspective of an embodiment of a fastening mechanism according to the invention.
FIG. 4 is a diagram showing the advantages in a given use of the mechanism according to the invention.
Figure 2:
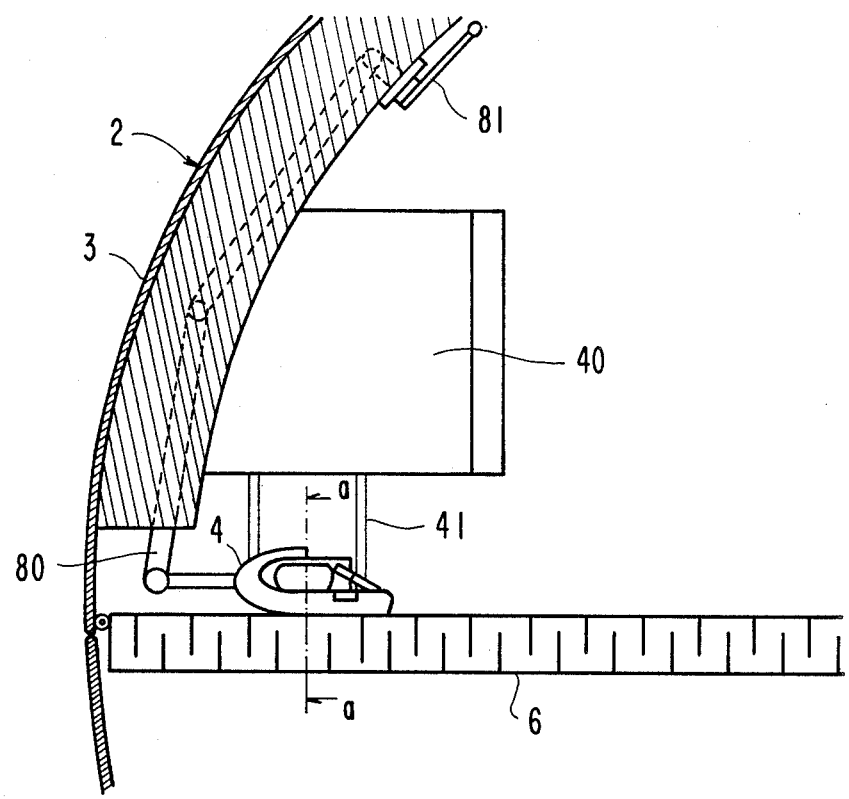
FIGS. 2 and 3 are two simplified views, front and side respectively, of the mechanism according to FIG. 1, in association with an aircraft door (shown partially), the mechanism being shown in its retracted position, FIG. 3 being a section referenced a—a in FIG. 2.

Referring now to the drawings, FIGS. 1 to 5 show a mechanism for fastening a life-saving device, for example a simple evacuation slide or dinghy 1, such as those found on aircraft 2 which fly over wide stretches of water such as seas and oceans. As is known, such slides are mounted on the doors 3, since they are easy and rapid to use with a minimum loss of time when required. A fastening shoe 4, 5, fast with the floor 6 of the aircraft 2, is generally provided on each side of the door 3.

At least one of the shoes, for example shoe 4, comprises a recessed housing 7, the other shoe advantageously comprising clipping and release means 8 which may be a recessed housing 9 with the same structure as that of shoe 4.

More precisely, the fastening mechanism comprises a rod 10 whose length is less than the distance separating the two shoes 4, 5. One end 11 of the rod comprises means 12 adapted to cooperate with the clipping and release means 8. These means 12 are for example an endpiece 13 adapted to be positioned in the recessed housing 9. It further comprises a counter-rod 14 and means for slidably mounting a first end 15 of the counter-rod with respect to the rod, so that the counter-rod 14 and the rod 10 may be positioned in at least two positions, respectively, a first, so-called "retracted" position, in which the distance between the two most remote ends of the rod and of the counter-rod, respectively, has a value allowing the second end 23 of the counter-rod 14 to be located outside the housing 7 when the endpiece 13 is in the housing 9, and a second, so-called "extended" position, for which the distance between these two most remote ends has a value greater than the distance separating the two shoes 4, 5.

These means for slidably mounting the end 15 of the counter-rod 14 with respect to the rod 10 are advantageously constituted by a cavity 16 made in the end 17 of the rod 10 opposite the endpiece 13, this cavity having a cross-section substantially complementary of that of the end 15 of the counter-rod 14. In order to define the two positions mentioned above, for example, the counter-rod 14 comprises a slot 18 whose length is substantially equal to the difference in length between the two most remote ends of the two elements 10 and 14 when they are in one or the other of the two "retracted" and "extended" positions. Moreover, a pin 19 passes through the slot 18 whilst being fast with the rod 10. Consequently, on passing through the slot, this pin constitutes a stop with the two ends thereof, thus defining the two extreme "retracted" and "extended" positions.

Figure 3:
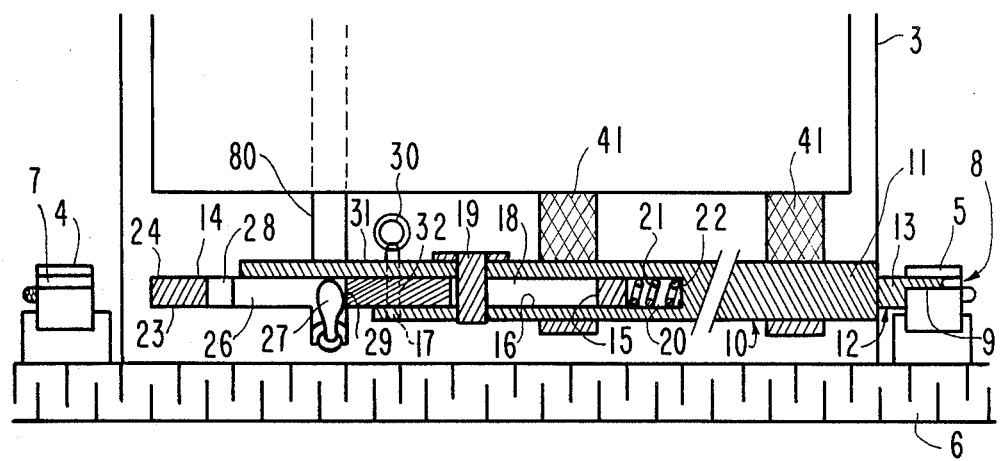

The mechanism also comprises means 20 for applying an elastic force between the rod 10 and the counter-rod 14 so as constantly to exert a force obliging the rod and the counter-rod to tend to take the "extended" position defined hereinabove. As illustrated in FIG. 3, these means 20 are advantageously constituted by at least one thrust spring 21 located in the bottom 22 of the cavity 16 closest to the endpiece 13 of the rod 10 and acting between this bottom and the end 15 of the counter-rod 14.

End 23 of the counter-rod 14 opposite end 15 located in the cavity 16 comprises an endpiece 24 whose shape is substantially complementary of that of the recessed housing 7 of the shoe 4. The section of this endpiece 24 is such that the total length of the rod/counter-rod assembly, taken between the two most remote ends 13 and 24, is greater than the distance separating the two shoes 4, 5.

The mechanism also comprises means for controlling the slide of one of the rod 10 and conter-rod 14 with respect to the other in a given direction 25. These means comprise, in a first embodiment, a notch 26 made, in the example illustrated, in the counter-rod 14, this notch 26 being adapted to receive a control finger 27 movable in the direction of slide 25 of the rod 10 with respect to the counter-rod 14, the depth of this notch 26 being substantially equal to the difference in length of the assembly of the two elements when they are in the two "retracted" and "extended" positions. This finger 27 may belong to a rod assembly 80 partly housed in the door and controlled by a handle 81.

In an advantageous embodiment, the notch 26 is in the form of an "L" which opens out at 28 laterally to the counter-rod 14, at a spot further from the rod 10 than its bottom 29.

For safety reasons, the mechanism also comprises means for latching/unlatching the rod with the counter-rod in at least one position, and advantageously in the two "extended" and "retracted" positions. As illustrated in FIG. 3, these means may be constituted by a pin 30 which penetrates in two orifices 31, 32 made in the rod and the counter-rod, respectively, being given that, in order to lock the mechanism in the two positions, the latter may comprise two pairs of orifices.

Finally, in order to facilitate control and use thereof, and also slide of the rod 10 with respect to the counter-rod 14 when it is not possible to do so with the finger 27 of the rod assembly, the mechanism comprises manual manoeuvring means, these means being, for example, constituted by a pull element 60 fast with the counter-rod 14 and advantageously in the form of a handle which enables it to be easily gripped by hand.

An embodiment of the means for latching-unlatching the rod with the counter-rod has been described hereinabove. However, it may be that the pin 30 is not easily accessible and that, particularly in cases of extreme urgency, time is lost when manipulating it. The variant embodiment illustrated in FIG. 5 enables this drawback to be partly overcome.

In this variant embodiment, the latching-unlatching means are constituted by a follower 61 mounted to rotate in cooperation with the manual pull 60. This follower is in the form of an "L" and is mounted about an axis of rotation 64 located at the base of the pull 60, this base being the common part between the pull 60 and the counter-rod 14. The axis of rotation lies at the common point of the two parts 62, 63 of the "L" and the follower is disposed in cooperation with the pull 60 so that part 62 is placed in the hollow 68 of this pull and part 63 is in line with the rod 10 in its direction of slide. Moreover, the end 67 of this part 63 must be able to abut, when it is in a certain position, as will be explained hereinafter, against the end 65 of the rod 60 facing the counter-rod 14.

Figure 5:
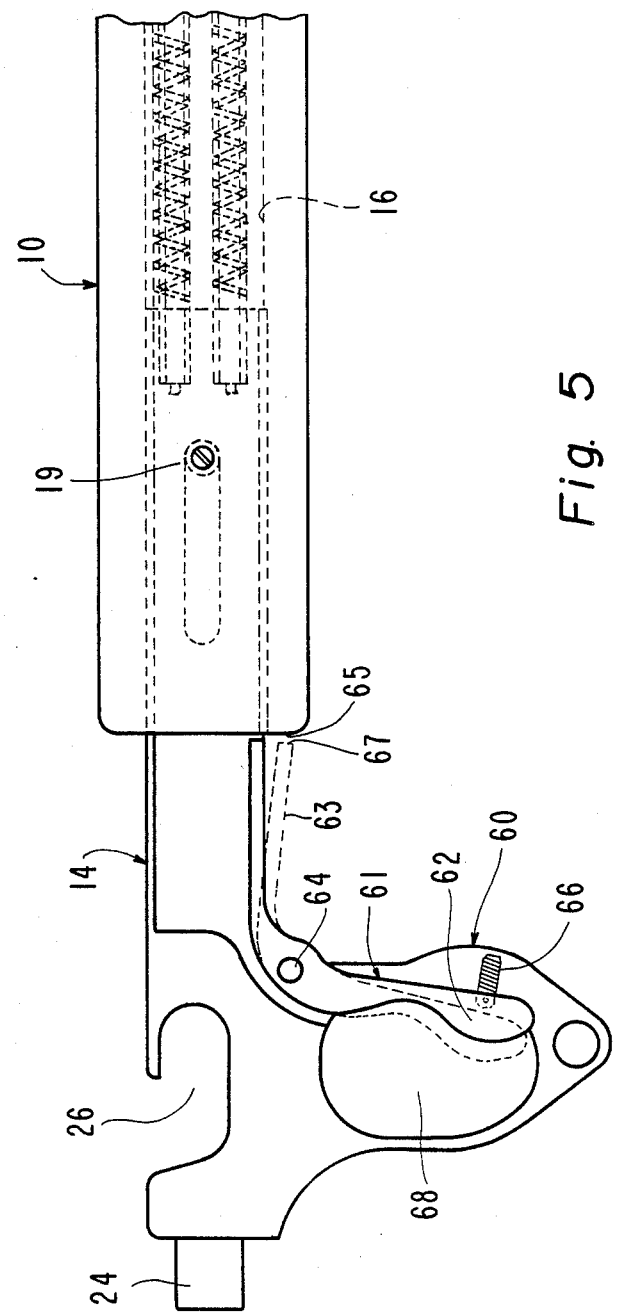
FIG. 5 shows a variant embodiment of a fastening mechanism according to the invention, this variant concerning more particularly an embodiment of the latching-unlatching means.

The follower 61 is therefore adapted to take two positions, respectively illustrated in FIG. 5 in broken lines and in solid lines; a first position in which part 62 makes an angle of a certain value with the pull 60, and a second position in which this part 62 makes a substantially zero angle with the pull, so that, when the follower is in the first position, the end 67 of its part 63 is adapted to oppose respective slide of the rod 10 and counter-rod 14 and, when it is in the second position, this part 63 is retracted from the path of slide of the rod and counter-rod with respect to each other.

Moreover, the mechanism comprises elastic means 66, for example a spring, which tend to return the follower into the first position, the one shown in broken lines.

The mechanism described hereinabove operates and is used in the following manner:

The evacuation slide/dinghy 1 is generally disposed folded in a container 40 fixed on the door 3 of the aircraft 2. Straps 41 join the slide to the fastening mechanism, more particularly passing around the rod 10. When the door is closed (FIG. 2), the mechanism is controlled in order to be in its "extended" position with the end 13 in housing 9 of shoe 5 and the endpiece 24 in the recessed housing 7, this control being effected with finger 27, via the rod assembly. The pin 30 locks these two elements in this position. When it is necessary to use the evacuation slide of a door, the finger 27 passes through the notch 26, when the door is opened, until it is released via outlet 28 in order to disconnect the slide from the door, the slide is then inflated and extends on the sea 50 (FIG. 4), remaining fastened to the aircraft by the fastening mechanism which remains located in the two shoes 4, 5. When all the passengers that the slide can contain have been embarked, the fastening mechanism is disconnected from the two shoes. To that end, pin 30 is removed and, by means of the pull 60 which is pulled manually, the counter-rod enters the cavity 16, this disengaging the endpiece 24 from housing 7. Consequently, the other end 13 of the rod may easily be disengaged from shoe 5 and the slide/dinghy may move away from the aircraft 2 (FIG. 4).

In the embodiment of the latching-unlatchng means of FIG. 5, the mechanism is easily disconnected from the two shoes. In fact, the crew member has only one manipulation to make. By gripping the pull 60, he/she also grips the follower 61 to pass it into the second angular position, i.e. the one in which its part 62 forms a substantially zero angle with the pull, part 63 retracts and allows the counter-rod 14 to slide with respect to rod 10, this part 63 entering, in this embodiment, in the cavity 16.

If the aircraft is obliged to land on the sea, the procedure consists in positioning it parallel to the waves, then in opening the "passenger" doors on the side opposite the one from which the swell 70 is coming (FIG. 4), as it is preferable not to open the doors facing the swell 70. In order to save all the passengers, it is then necessary to transport the evacuation slides 71 from these inoperative doors onto the thresholds of the open doors. From the description of the mode of use, it will be noted that there is no difficulty in releasing the fastening mechanism from one door threshold in order to fasten it on another, and this may be effected very rapidly. Such manipulation raises no problem for the crew, as the mechanism weighs relatively little, and in any case much less than the mechanisms of the prior art, since it comprises approximately only half the number of elements with respect to the mechanisms of the prior art. The mechanism according to the invention therefore allows a slide and its fastening mechanism to be transported from one door to another, under optimum conditions.

In general, this mechanism enables an evacuation slide to be rapidly disconnected from an aircraft whenever the need is felt.

What is claimed is:

1. A mechanism for fastening a life-saving device for an aircraft, having at least one system of two fastening shoes fast with the floor of said aircraft, at least a first of said shoes comprising a recessed housing, said mechanism comprising:
   a rod, one of the two ends of said rod comprising means for clipping and releasing with respect to the second shoe,
   a counter-rod,
   means for slidably mounting a first end of said counter-rod with respect to said rod, so that said counter-rod and said rod can lie in at least two positions, a first, so-called retracted position and a second, so-called extended position,
   means for applying an electric force between said rod and counter-rod to tend to position them in said extended position,
   means for latching-unlatching said rod and counter-rod with respect to each other in at least one of the two positions,
   means for controlling slide of one of said rod and counter-rod with respect to the other in a given direction,
   the second end of said counter-rod comprising an endpiece whose shape is substantially complementary of said recessed housing in said first shoe, so that said endpiece can be housed in said recessed housing.

2. The mechanism of claim 1 wherein the means for slidably mounting a first end of said counter-rod with respect to said rod so that said counter-rod and said rod can lie respectively in at least two positions, a first retracted position and a second extended position, comprise a cavity made in said rod and having a shape substantially complementary of said first end of said counter-rod, a slot made in one of said rod and said counter-rod whose length is substantially equal to the difference in length of said rod and said counter-rod when they are in the said two retracted and extended positions, and a pin passing through said slot, said pin being fast with whichever of said rod and said counter-rod which does not contain said slot.

3. The mechanism of claim 2 wherein the means for applying an elastic force between said rod and said counter-rod to tend to position them in said extended position, comprise at least one thrust spring located in the bottom of said cavity in order to act between this bottom and said first end of said counter-rod.

4. The mechanism of claim 1 wherein the controllable means for controlling slide of one of said rod and said counter-rod with respect to the other in a given direction, comprise a notch made in said rod, said notch being adapted to receive a control finger movable in the direction of slide of the rod with respect to said counter-rod, the depth of said notch being substantially equal to said difference in length of said rod and said counter-rod when they are in the said two positions.

5. The mechanism of claim 4 wherein said notch is L-shaped and it opens out laterally to said rod at a spot further from said counter-rod than the bottom of said notch.

6. The mechanism of claim 1 wherein the controllable means for controlling slide of one of said rod and said counter-rod with respect to the other in a given direction, comprise a notch made in said counter-rod, said notch being adapted to receive a control finger movable in the direction of slide of the rod with respect to said counter-rod, the depth of said notch being substantially equal to said difference in length of said rod and said counter-rod when they are in the said two positions.

7. The mechanism of claim 6 wherein said notch is L-shaped and it opens out laterally to said counter rod at a spot further from said rod than the bottom of said notch.

8. The mechanism of claim 1 comprising means for latching-unlatching said rod and counter-rod in at least one of the retracted or extended positions.

9. The mechanism of claim 1 comprising means for manually maneuvering said counter-rod with respect to said rod.

10. The mechanism of claim 9 wherein the manual maneuvering means are constituted by a pull element fast with said counter-rod.

11. The mechanism of claim 10 wherein said means for latching-unlatching said rod and counter-rod comprise a follower mounted to rotate in cooperation with said pull element, said follower being adapted to take, by a first part, at least two angular positions with respect to said pull element, a second part of said follower, when it is in the angular position making the largest angle, being adapted to oppose respective slide of said rod and counter-rod, and being retracted from the path of this slide when the follower is in the angular position making the smallest angle.

12. The mechanism of claim 8 wherein the means for latching-unlatching said rod and counter-rod in at least one of the retracted or extended positions comprise at least one pin adapted to cooperate in two orifices made respectively in said rod and counter-rod in order to connect them in at least one of the said two positions.

* * * * *